Jan. 25, 1949.    M. J. STATEMAN    2,459,849
TESTING CIRCUIT
Filed July 8, 1946

MURRAY J. STATEMAN
INVENTOR.

BY

Patented Jan. 25, 1949

2,459,849

UNITED STATES PATENT OFFICE 2,459,849

TESTING CIRCUIT

Murray J. Stateman, New York, N. Y., assignor to Federal Telephone and Radio Corporation, New York, N. Y., a corporation of Delaware Application July 8, 1946, Serial No. 681,802

9 Claims. (Cl. 175—366)

This invention relates to electrical apparatus, and particularly to apparatus dynamically indicating resistance changes in selenium rectifiers during "electro-forming."

Electro-forming is a step in making selenium rectifiers which comprises forcing electrical currents through them in the reverse direction. It increases the front-to-back-resistance ratio and adds a refinement to the basic process of manufacture which consists of placing a selenium layer on one side of a conductive sheet and of bonding it thereon by heat and pressure.

By altering relative resistance values, i. e., by changing the front-to-back ratio, electro-forming also alters absolutely both the value of the forward resistance and the value of the reverse resistance. It is particularly desirable to observe dynamic forward resistance changes which occur during this process. Thus, the duration of electro-forming and other conditions pertaining to it can be controlled and manufacturing standards can be determined. In particular, methods can be devised for obtaining low values of forward resistance.

According to former methods, static measurements of resistance values of a selenium rectifier could be made in a succession of steps alternating with and following, respectively, a succession of electro-forming periods. For example, the forward resistance might be measured from time to time after discrete electro-forming periods. Data so obtained could be converted into a graph by joining together separate properly plotted data points, and could give fair qualitative information of the sort desired. However, this method of study is slow and expensive, and does not include observation of changes as they actually occur during electro-forming.

It is an object of the present invention to provide apparatus which will permit observation of dynamic resistance value changes in selenium rectifiers during electro-forming.

According to the general principle of this invention, a succession of alternating positive and negative pulses of electricity are impressed across a selenium rectifier. The amplitudes of all the positive and negative pulses are separately controllable. Obviously, every other voltage pulse will have the same polarity and will tend to force a pulse of current through the selenium rectifier in the same direction. All the remaining pulses will alternate with them and will tend to force current pulses through it in the opposite direction. Associated with the selenium rectifier, circuit elements, including meters, are arranged to indicate how the resistance of the selenium rectifier changes as the pulsations, which force current through the rectifier in its reverse direction, accomplish, progressively, electro-forming.

Other objects, features and advantages of this invention will become apparent to those skilled in the art from the following detailed description of the invention taken in connection with the drawings in which.

Figure 1:
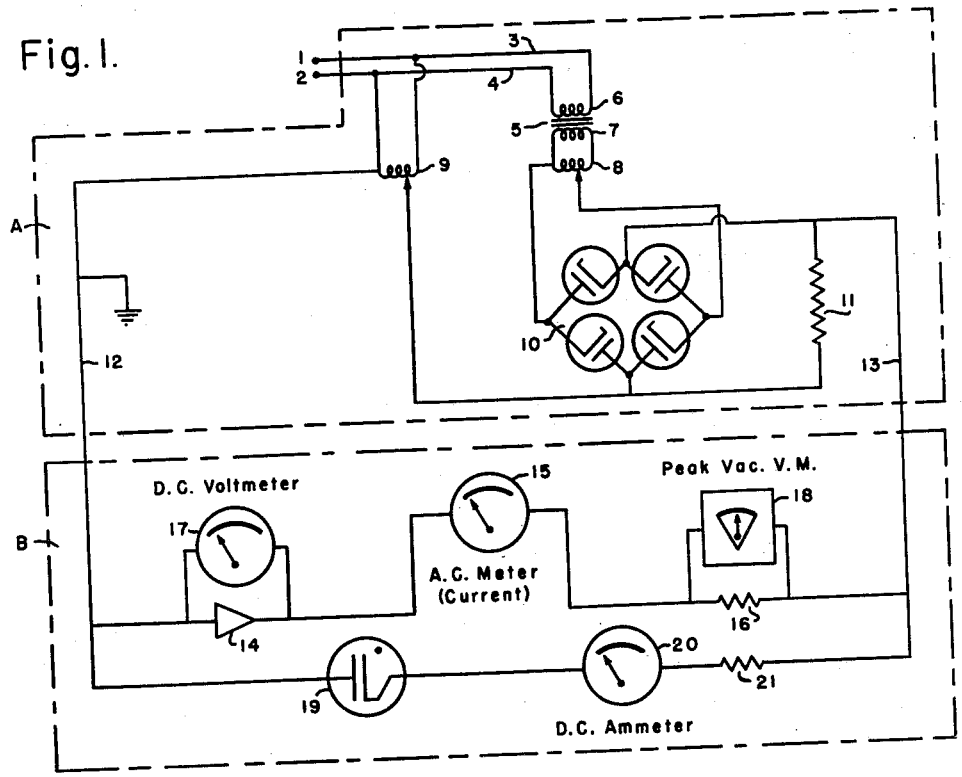
Fig. 1 is a schematic circuit diagram.

Referring now more particularly to Fig. 1, block A is the portion of the apparatus which supplies and controls the voltage pulsations to be applied to the selenium rectifier under test. Block A is supplied with alternating-current energy from an external source such as a 115-volt, 60-cycle supply line. Conductors from such a source are connected to input terminals 1 and 2 which, in turn, are connected to conductors 3 and 4. Transformer 5 has the ends of its primary 6 connected to conductors 3 and 4. The ends of its secondary 7 are connected across an auto-transformer 8 of the type known as a variac. Connected across supply lines 3 and 4 is a second auto-transformer 9 which may also be a variac. The output of variac 8 is fed to full wave rectifier 10 which may be of a bridge type as shown in Fig. 1. Rectifier 10 is connected to resistor 11 and causes a voltage to appear across it which consists of a succession of pulses of the same polarity. Such a voltage is ordinarily described as pulsed direct current. The movable contact of variac 9 is connected to one end of resistor 11 so that an alternating-current voltage from variac 9 is added to the pulsed direct current. The other output terminal of variac 9 may be grounded and is connected to conductor 12. The end of resistor 11 which is not connected to variac 9 is connected to conductor 13.

Figure 2:
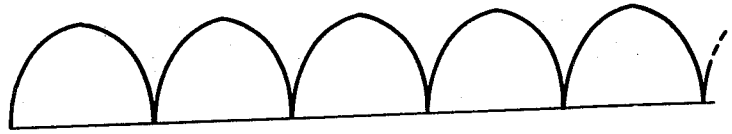
Figs. 2, 2a and 2b are graphs of voltage, plotted against time, at three points in the circuit of Fig. 1.
Figure 2A:
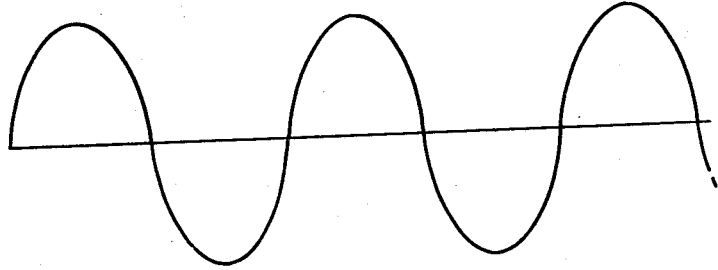
Figure 2B:
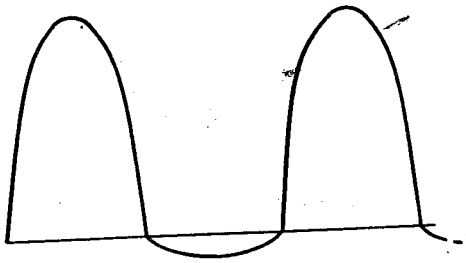

Conductors 12 and 13 are power output leads from block A and input power leads to block B. The wave form of the voltage existing between them is a distorted sine wave whose positive-going half-waves are larger than its negative-going half-waves. This wave form is qualitatively shown in Fig. 2b, while the pulse of direct-current voltage and the alternating-current voltage which are added to produce it are shown in Figs. 2 and 2a, respectively. The ratio of positive peak voltage to negative peak voltage is controllable, within limits, by adjustment of variacs 8 and 9. The amplitude of the positive peaks of this wave is the sum of the positive peaks of the alternating-current voltage coming from variac 9 and of the direct-current pulses across resistor 11 which are in phase with them. The amplitude of the negative peaks is the algebraic sum of the negative peaks of the alternating-current voltage and the direct-current pulses which are 180° out of phase with them. As a result, a voltage is provided by block A which is ideal for the purpose of this invention. The large positive pulses provide the strong electrical pressure required for electro-forming, whereas the small negative swings provide sufficient electrical pressure to actuate measuring devices which indicate the forward resistance and other characteristics of the selenium rectifier under test. Moreover, these alternating pulses occur at a sufficiently high frequency to cause meters ordinarily operated by direct currents to strike mechanical and electrical averages of the pulsed currents through them and give average readings.

This output voltage of block A is fed to testing block B on conductors 12 and 13. Connected across these conductors in series are selenium rectifier 14 (which is the element under test), alternating current meter 15, and resistor 16. This apparatus will be most conveniently operated, of course, if quick connector means are provided whereby an element to be tested, such as selenium rectifier 14, can easily be connected or disconnected.

A direct current voltmeter 17 is connected in shunt across selenium rectifier 14, and a peak reading vacuum tube voltmeter 18 is connected in shunt across resistor 16. Meter 18 is polarized so as to show peaks of voltage across resistor 16 due to currents flowing through resistor 16 in the direction from meter 15 and rectifier 14 according to the positions of these elements shown in the drawing. Therefore, the vacuum tube meter will indicate voltage drops across resistor 16 caused by currents passing through rectifier 14 in a forward direction.

Connected across conductors 12 and 13 in series are gas tube 19, which has its plate connected to conductor 12, direct-current ammeter 20 and current-limiting resistor 21. Gas tube 19 will draw current only when conductor 12 is at a higher potential than conductor 13. This is the condition which will also cause a forward current to flow through rectifier 14.

Most of the foregoing deals with the physical arrangement of an embodiment of this invention. The following explains some of the principles of operation.

Current will flow from conductor 12 to conductor 13 through tube 19 whenever conductor 13 swings negative with respect to conductor 12. Tube 19, being a gas tube, can pass large currents. Therefore, ammeter 20 need not be a highly sensitive instrument to perform its function herein. Though both tube 19 and ammeter 20 have low internal impedances, resistor 21 does not and, therefore, it serves to limit the current through this circuit. This protects tube 19 and avoids a low impedance shunt across the other series circuit between conductors 12 and 13.

Block A preferably should have such voltage regulation that the currents drawn by the circuits of block B are insufficient appreciably to change the wave form of the voltage coming to them from block A.

Resistor 21 may be selected, with respect to the properties of ammeter 20, so that the scale of this device directly indicates the average voltage of the pulsations during which conductor 13 is negative with respect to conductor 12.

This device offers a direct indication, during electro-forming, of the average amplitude of these pulses of voltage which, as has been explained, alternate with the electro-forming pulses and cause forward current to flow through rectifier element 14. It is obvious that any separate or any combined readjustments of variacs 8 and 9 will change the reading of ammeter 20.

Ammeter 15 is arranged so that, during electro-forming, its needle deflection will be substantially proportional to the reverse resistance of rectifier 14. This is possible because the reverse resistance of rectifier 14 is of such an order of magnitude that it presents the largest part of all the impedance in the series circuit in which ammeter 15 is located. Thus arranged, ammeter 15 will indicate, qualitatively at least, changes which occur in the value of the reverse resistance of rectifier 14 as electro-forming proceeds. Ammeter 15, moreover, may be calibrated so as to indicate resistance values directly, and may even have a plurality of resistance scales each applicable under a different set of circuit conditions.

Direct-current voltmeter 17 will indicate a voltage, during electro-forming, which can be mathematically described as the algebraic sum of the average direct-current voltage of the pulses across rectifier 14 when its "back" is at a higher potential than its "front" and the average direct-current voltage of the pulses across that element measured when its front is at a higher potential than its back. More simply stated, this meter will indicate the average direct-current voltage across rectifier 14. Therefore, this meter, in cooperation with meter 20, will give an indication of the amplitude of the pulses forcing reverse current through rectifier 14. This meter may have different scales respectively applicable according to certain different readings of meter 20 and may thereby be a direct reading device.

Since vacuum tube voltmeter 18 gives readings proportional to current flow through rectifier 14 in a forward direction, it may, by proper selection of the value of resistor 16, and by proper calibration, indicate directly the forward resistance of rectifier 14. Small changes in this forward resistance will suffice to actuate this indicating apparatus since the internal impedance of meter 15 in this series circuit is small and the resistance of resistor 16 may likewise be small.

To operate this apparatus a selenium rectifier similar to element 14 will be connected into the circuit in the manner described. Variacs 8 and 9 will be adjusted so that pulsed voltages impressed in opposite directions across rectifier 14 will have average values of proper orders of magnitude.

These adjustments can easily be made with the assistance of meters 20 and 17. The variacs are readjusted thereafter during the electro-forming period, since a constant current must be maintained in the reverse direction during electro-forming. A higher reverse voltage is required due to the increase in reverse resistance. However, with the aid of variacs 8 and 9 the forward voltage is kept constant through the process. Meters 15 and 18 will give indications, at once, regarding, respectively, the reverse and forward resistance of the selenium rectifier. As time goes on, electro-forming will improve the front-to-back ratio and accordingly, the value of the forward resistance may rise slightly and that of the reverse resistance will rise rapidly. As the reverse resistance increases, the current through meter 15 will drop. This meter will indicate this change dynamically as it occurs and will show the point where it stops. The current is then increased to continue the electro-forming process and the reading of meter 17 will rise. However, the reading of direct-current meter 20 will hold steady due to the proper adjustment of both variacs.

It may be advantageous, for calibrating the meters—in first setting up this apparatus, or for adjusting variacs 8 and 9—in preparation for electro-forming, to use temporarily, in the place where normally a selenium rectifier goes, an element, which may or may not be a selenium rectifier, having known resistance values in both directions. After calibration of the meters or adjustment of the variacs while this element is in place a selenium rectifier may be substituted for electro-forming.

The peak readings of meter 18 will rise as the forward resistance of the selenium rectifier rises. Electro-forming can accordingly be controlled. The rate at which electro-forming is carried on and the duration of the electro-forming period can be selected so as to obtain predetermined effects upon rectifier 14.

It will be obvious to those skilled in the art that, by adhering to the underlying principle of this invention, a variety of circuits can be devised for testing the characteristics of other elements whose resistance values change with such variables as time and temperature, provided, of course, that routine modifications are made in the apparatus shown herein as the preferred embodiment.

It is also obvious that there may be connected across conductors 12 and 13 another series circuit which is similar to that containing gas tube 19 and in which the connections of the gas tube are reversed. Thus, a meter, corresponding to meter 20, would give an indication of the average amplitude of the electro-forming series of pulses and this indication would not be altered by changes in the resistance values of the selenium rectifier. Likewise, a second vacuum tube voltmeter may be connected across resistor 16 and may be polarized so as to give peak readings with respect to the electro-forming pulses.

All such variations from the embodiment set forth herein are within the scope of this invention.

What I claim is:

1. A circuit for measuring changes in resistance of a selenium rectifier during electro-forming including a source of voltage having a wave form consisting of voltage pulses of one polarity alternating with voltage pulses of the opposite polarity, means for separately controlling the amplitudes of said pulses of one polarity and said pulses of the opposite polarity, means for connecting said source of voltage across said selenium rectifier so that said pulses of one polarity force currents therethrough in a reverse direction and said pulses of the opposite polarity force currents therethrough in the forward direction, means for indicating the amplitudes of said pulses of one polarity and said pulses of the opposite polarity, means for indicating changes in the magnitudes of the reverse currents and the forward currents through said rectifier during electro-forming.

2. A circuit as in claim 1 in which said means for indicating said changes in the magnitudes of said currents are calibrated to show changes in reverse and forward resistance of said selenium rectifier as electro-forming proceeds.

3. A circuit for measuring changes in resistance of a selenium rectifier during electro-forming including a source of voltage having a wave form made up of voltage pulses of one polarity alternating with voltage pulses of the opposite polarity, means for separately controlling the amplitudes of said voltage pulses of one polarity and said voltages of the opposite polarity, means for connecting said source of voltage across said selenium rectifier so that said pulses of one polarity force currents therethrough in the reverse direction and said pulses of the opposite polarity force currents therethrough in the forward direction, means for indicating the average amplitudes of said voltage pulses of one polarity and of said voltage pulses of the opposite polarity, and means for indicating the average currents through said rectifier in said reverse direction and in said forward direction.

4. A circuit for measuring changes in the forward resistance and the reverse resistance of a selenium rectifier during electro-forming including a source of electro-forming voltage, said source of voltage being connected across said selenium rectifier so that its voltages force currents therethrough in the reverse direction, another source of voltage, said last-mentioned source of voltage being connected across said selenium rectifier so that its voltages force currents therethrough in a forward direction, the voltages which force current through said selenium rectifier in its reverse and its forward directions being pulsed voltages so alternating with respect to each other that, over a given period of time, some currents are forced through said rectifier in each direction, means for indicating the average amplitudes of the voltages impressed on said rectifier for forcing currents in said reverse and for forcing currents in said forward directions, means for indicating the average currents through said rectifier in said reverse and said forward directions, said means for indicating being adapted to show changes in the values of the reverse resistance and the forward resistance of said rectifier.

5. Electrical apparatus for indicating resistance changes in a selenium rectifier during electro-forming including a source of voltage having pulses of one polarity alternating with pulses of opposite polarity, means for separately controlling the amplitudes of said pulses of one polarity and said pulses of opposite polarity, means for connecting said source of voltage across said selenium rectifier so that said pulses of one polarity force currents therethrough in its reverse direction, said means including an alternating-current ammeter and a resistor arranged in series with said selenium rectifier and said source of voltage, a peak reading vacuum tube voltmeter in shunt across said resistor and so polarized as to give indications only when current moves through said resistor in the same direction as the forward direction through said rectifier, a direct-current voltmeter in shunt across said selenium rectifier, and means connected in shunt across the series circuit comprising said selenium rectifier, said ammeter, and said resistor which are adapted to indicate the amplitudes of said pulses of said opposite polarity.

6. Electrical apparatus as in claim 5 in which said means connected across said series circuit include an electron discharge device polarized to pass currents in a direction corresponding to the forward direction through said rectifier, a direct-current ammeter in series with said electron discharge device, and a resistor in series with said electron discharge device and said ammeter.

7. Electrical apparatus as in claim 5 in which said source of said voltage includes a full wave rectifier having a pulse direct-current output, means for supplying an alternating voltage to the input of said full wave rectifier, a load impedance connected across the output of said full wave rectifier, and means for adding an alternating voltage to the pulsed direct-current output of said rectifier so that its voltage swings in one direction are in phase with half of the pulses of direct-current voltage and its voltage swings in the opposite direction are 180° out of phase with the other half of the pulses of direct-current voltage, which other half alternates with the half first-mentioned.

8. A circuit for measuring changes in resistance of a selenium rectifier during electro-forming including a source of voltage which has a distorted sine-wave form, wherein the amplitudes of the negative swings and the positive swings are separately controllable, means for indicating separately the amplitudes of the negative and positive swings of said voltage, means for impressing said voltage across a selenium rectifier so that all the swings of one polarity force current therethrough in a reverse direction and the swings of the opposite polarity force a current therethrough in a forward direction, a resistor in series with said selenium rectifier, and a peak reading vacuum tube voltmeter in shunt across said resistor, said vacuum tube voltmeter being polarized to give indications only when current through said resistor flows in the same direction as the forward current direction through said selenium rectifier, said indications being proportional to values of forward resistance of said rectifier.

9. An apparatus for indicating changes in the forward resistance of a selenium rectifier during electro-forming including a source of voltage which supplies electro-forming voltage pulsations all having the same polarity and other voltage pulsations having the opposite polarity and alternating therewith, means for connecting said voltage source across said selenium rectifier, said selenium rectifier being so connected to said source of voltage that the electro-forming pulsations force currents through it in a reverse direction and the other pulsations force currents through it in a forward direction, an element having resistance which is in series with said selenium rectifier and said source of voltage, and voltage-indicating means in shunt across said element having resistance, said voltage-indicating means being adapted to give indications proportional to the forward current through said rectifier.

MURRAY J. STATEMAN.

REFERENCES CITED

The following references are of record in the file of this patent:

UNITED STATES PATENTS

| Number | Name | Date |
|---|---|---|
| 2,010,697 | Lord | Aug. 6, 1935 |